Aug. 15, 1950 R. B. MASON 2,519,061
HYDRATION OF ETHERS
Filed April 12, 1947
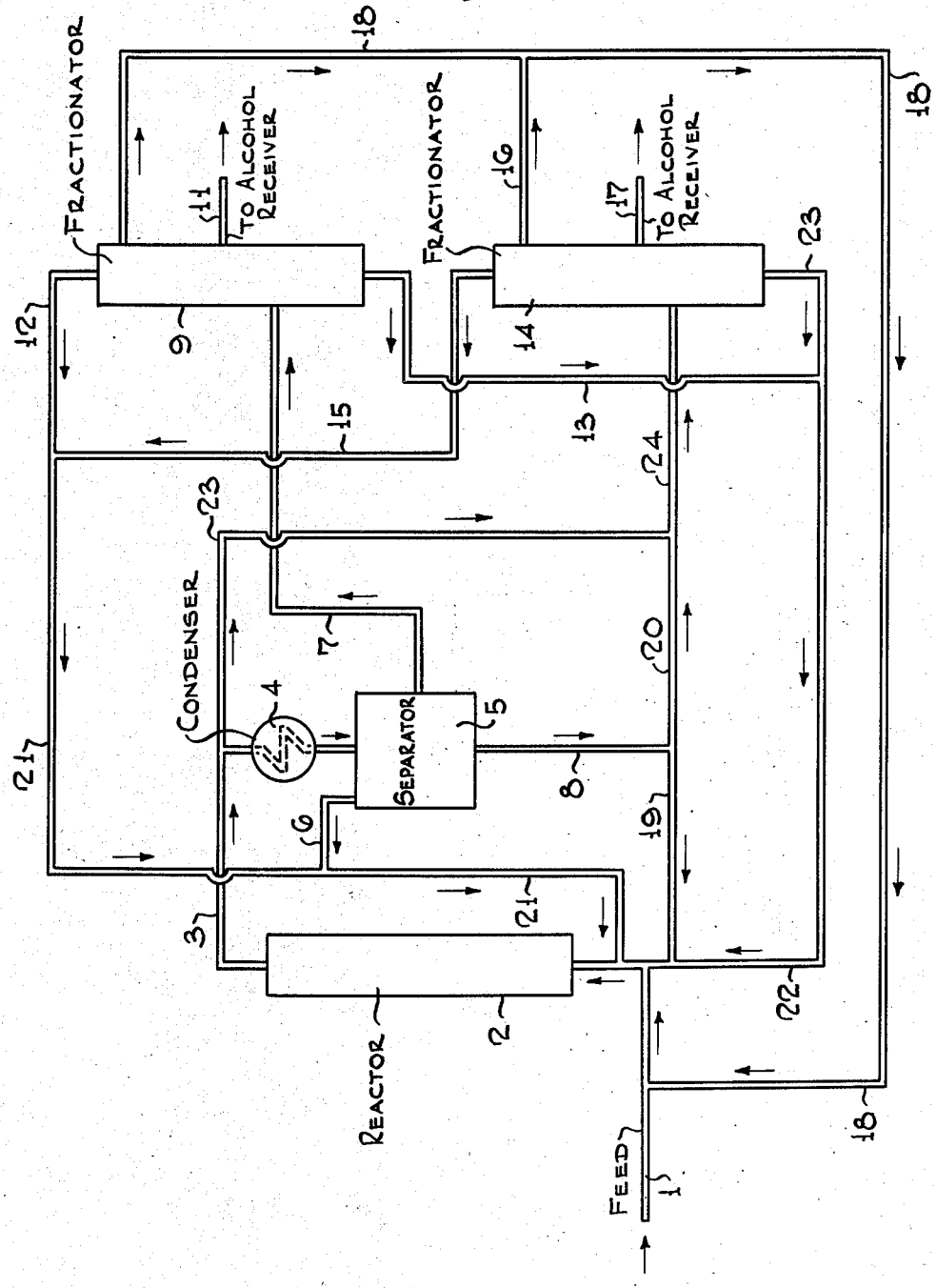
Ralph B. Mason Inventor
By Henry Berk Attorney Patented Aug. 15, 1950

2,519,061

UNITED STATES PATENT OFFICE 2,519,061

HYDRATION OF ETHERS

Ralph Burgess Mason, Baton Rouge, La., assignor to Standard Oil Development Company, a corporation of Delaware Application April 12, 1947, Serial No. 741,093

6 Claims. (Cl. 260—632)

This invention is concerned with the catalytic hydration of aliphatic ethers to the corresponding aliphatic alcohols. More particularly, it concerns the vapor-phase hydration of aliphatic ethers to the corresponding aliphatic alcohols under conditions whereby alcohol yield and selectivity are markedly improved, and gas yield and selectivity markedly repressed.

The production of alcohol, in particular, ethyl alcohol, by the hydration of olefin (ethylene) in the presence of an acidic catalyst is accompanied by the formation of certain amounts of ether within well defined range. For example, in the acid catalyzed hydration of ethylene to ethyl alcohol approximately 10% to 15% of diethyl ether is formed as a by-product. Similarly 8% to 12% of isopropyl ether by-product accompanies the production of isopropyl alcohol by the hydration of propylene. Normal market demand for these ethers adequately absorbs the above amounts. However, in the event of severe demands on alcohol production or lag in ether demand, it is customary to reconvert the ether to alcohol.

To obtain maximum alcohol production, the by-product ether is hydrated at temperatures of 350° F. to 800° F. preferably in the presence of hydration catalysts such as difficultly reducible hydrous oxides such as alumina, zirconia, molybdenum oxide, tungsten oxide, silica, chromia, etc., or combinations of oxides such as nickel oxide on alumina, or modifications of these oxides such as oxide-salt compositions, e. g., alumina-aluminum sulfate.

From equilibrium considerations for the hydration of ether, the total pressure is not critical but since hydration is accompanied by dehydration, superatmospheric pressures ranging up to 200 atmospheres are preferred. Also, partial pressures of the reactants are critical and hydration is favored by high partial pressure of water vapor. Under these favorable conditions a considerable portion of the ether is lost by the formation of the olefin, which in the case of ethyl ether is ethylene.

According to the terms of the invention the loss of the ether feed stock is prevented by operating at superatmospheric pressure and in addition, in the presence of olefin partial pressures ranging from 10% to 80% of the total pressure.

The main object of this invention therefore is to secure maximum production of alcohol from the hydration of ether or of olefin. Another object of the invention is to repress the formation of olefin hydrocarbon during the conversion which ordinarily occurs and cuts down the yield and conversion to alcohol.

According to the invention, the aliphatic ether and water vapor are mixed in vapor phase and the mixture of reactants is passed to a catalytic conversion zone containing a hydration catalyst such as one of those mentioned above. The mixture is passed over the catalyst mass preferably at high temperature at superatmospheric pressure. The optimum temperature and pressure will depend on the particular ether being hydrated, the ether space velocity, and the ratio of reactants, i. e., the ether/steam ratio. The present invention is based on the fact that marked and unexpected improvement in selectivity to alcohol is obtained by operating the conversion under superatmospheric pressure and under high olefin partial pressures. In this regard, it is desirable to carry out the reaction under olefin partial pressures ranging from 10% to 80% of the total pressure. The ratio of water/ether partial pressures preferably varies from 1 to 10.

Even under these favorable conditions the equilibria existing between the olefin, ether, and alcohol prevent complete hydration of the ether to alcohol. Hence, for ultimate and maximum conversion, the reaction products are separated and the olefin, ether and water are recycled and the alcohol is drawn off.

The drawing represents a diagrammatic sketch in elevational cross section of the apparatus used in operating with ethyl ether as the feed in the conversion to ethyl alcohol. The separation of the reaction products is obtained by fractionation. With feeds producing alcohols boiling higher than water, the water recycle line and the line to the alcohol receiver will necessarily be interchanged. Also, with some feeds provisions will have to be made for separating azeotropic mixtures. In low pressure operation, the gaseous olefin and the liquid feed and products are separated by condensation, and the olefin is recycled directly. At higher pressures, the overhead from the fractionating columns provide the greater part of the olefin recycle.

Referring specifically now to the drawing, the system will be described for the conversion of ethyl ether to ethyl alcohol. Ether vapor and steam are led through line 1 to reactor 2 which consists of a vessel containing catalyst bed or catalyst suspension of such material as alumina, chromia, etc. The reactor is operated at temperatures between 350° F. and 800° F. and at pressures ranging from atmospheric to 200 atmospheres. The reaction products are taken overhead through line 3, condensed in condenser 4 and led to separator 5. The reaction products consist of alcohol and unconverted ether, water and olefin gas. Uncondensed gas, which in this case is ethylene, is returned from the separator through line 6 to the olefin recycle line 21 which returns it to the reactor 2. The separator is designed so that two liquid phases, which will be present under some conditions of operation, may be treated separately, i. e. the upper layer consisting chiefly of alcohol and ether and the lower layer consisting chiefly of alcohol and water. Separate fractionators 9 and 14 are provided for treatment of each of the layers. The alcohol-ether layer is withdrawn from the separator through line 7 and pumped to fractionator 9. Any unconverted olefin passes overhead from fractionator 9 through line 12 to the olefin recycle line 21 for return to the reactor. Unconverted ether is removed near the top of the column through ether recycle line 18 for return to the reactor 2. Alcohol product is withdrawn through sidestream 11 and sent to a receiver not shown. Bottoms containing predominately water are removed through line 13 to water recycle line 19 for return to the reactor through line 22. Similarly, the alcohol-water layer is withdrawn from separator 5 by line 8. If the alcohol content of this stream is too low it may be returned directly via lines 19 and 22 to the reactor as feed. Otherwise it is drawn off and passed through line 20 to fractionating tower 14 which operates similarly to tower 9. Any unconverted ethylene or uncondensable gases pass overhead through line 15 into olefin recycle line 21 for return to the reactor to maintain the desired olefin partial pressure. Unconverted ether is withdrawn near the top of the column through line 16 and passed to the ether recycle line 18 for return to the reactor. Alcohol is removed as a side stream through line 17 to a receiver not shown. Bottoms containing predominately water are withdrawn through line 23 and returned to the reactor through line 22.

As mentioned previously, if the conditions of operation are such that it is not economical to distill the lower layer in the separator, it may be recycled directly as recycle water or the entire liquid condensate may be distilled in the column 14 normally used for fractionating the lower liquid layer. In this case, provision is made to by-pass the condenser and separator and charge the entire effluent through lines 23 and 24 from the reactor to the fractionating column 14. This is particularly desirable in high pressure operation with low ratios of water to ether.

According to the invention, care must be taken in the operation of the reactor 2 with regard to the partial pressure of the ethylene. As stated previously, the total pressure for the ether hydration reaction is not critical and may be varied over a wide range. However, to secure high alcohol yield and selectivity as taught by this invention, the operation must be conducted at superatmospheric pressure, which may be varied over wide ranges, and the ethylene partial pressure must be maintained at a figure ranging from 10% to 80% of the total pressure.

*Example I*

The data tabulated below illustrate the effect of conducting the reaction under superatmospheric pressures and, in addition, the effect of operating under added ethylene partial pressures. In this operation ethyl ether and water were fed to an alloy steel corrosion resistant reactor or to a glass reactor containing a commercial grade of alumina activated by heating to 1200° F. for three hours. The pressure was maintained by back pressure of ethylene gas which was formed in the reaction.

| Unit | Glass | Alloy Steel Reactor | | | | |
|---|---|---|---|---|---|---|
| Catalyst Volume, cc | 200 | 200 | 200 | 200 | 200 | 200 |
| Catalyst Age, Hrs. at End of Period | ¹42 | 30 | 21 | 65 | 179 | 185 |
| Total Pressure, p. s. i. g | Atmos. | 50 | 100 | 200 | 200 | 200 |
| Temperature, °F | 650 | 640 | 640 | 650 | 650 | 650 |
| Ether Feed Rate, Liquid v./v./hr | 0.690 | 0.655 | 0.655 | 0.630 | 0.630 | 0.645 |
| Overall Feed Rate, Liq. v./v./hr | 1.28 | 1.26 | 1.24 | 1.24 | 1.27 | 1.26 |
| Mole Ratio, Steam/Ether | 4.9 | 5.2 | 5.1 | 5.6 | 5.1 | 5.5 |
| Mole Ratio, Ethylene/Ether | | | | 0 | 2.2 | 2.6 |
| Ethylene Partial Pressure in Feed, p. s. i. g | 0 | 0 | 0 | 0 | 53 | 57 |
| Ether Conversion, Per Cent Output Basis | 87.6 | 74.5 | 64.5 | 56 | 54 | 50 |
| Gas Yield, Weight Per Cent of Ether | 48.7 | 22.6 | 10.4 | 8.0 | 2.3 | 0 |
| Selectivity to Gas, Per Cent | 73.5 | 40 | 21.2 | 19 | 5 | ---- |
| Alcohol Yield (95.5% Alc.), Weight Per Cent of Ether | 30.2 | 48.7 | 58 | 59 | 66 | 66 |
| Selectivity to Alcohol | 26.5 | 50.4 | 69 | 81 | 95 | 100 |
| Material Balance, Weight Per Cent | 98 | 94 | 95 | 90 | 95 | 94 |

¹ 30 hours in alloy steel reactor.

It will be observed that marked selectivity to alcohol and substantial increase in alcohol yields have resulted from operation at superatmospheric pressure. Thus, alcohol yields rose from 30.2% to 48.7% and 58% and alcohol selectivity from 26.5 to 50.4 and 69.0 when operating at successively increased total pressures.

A pronounced improvement in selectivity and alcohol yield was obtained with added ethylene partial pressures of 23% and 28% of the total pressure, thus for example, at 28% ethylene partial pressure alcohol yield rose from 59 to 66 weight percent of the ether charged and the selectivity increased from 81% to 100% or in other words the degradation of the ether feed to ethylene was completely inhibited. When the operation is conducted at lower total pressures, use of higher percentage of ethylene will be desirable.

In the hydration of ethyl ether with activated alumina catalyst I prefer to operate at a temperature in the range of 610° F. and 100 lbs. gauge pressure or in the neighborhood of 650° F. and 200 lbs. gauge pressure. It will be noted from runs 5 and 6 that alcohol yields of 66 weight percent of ether feed and selectivities of 95% to 100% were obtained when the mol ratio of ethylene to ether in the feed was between 2:1 and 3:1 as compared with an alcohol yield of 59% and selectivity of 81% in the absence of ethylene. The use of olefin gas recycle to the feed as indicated above, is definitely advantageous in promoting high alcohol yields and high selectivity to alcohol.

Although the process has been described and illustrated by the conversion of ethyl ether to ethyl alcohol, it is likewise adapted for use in the hydration of higher ethers such as n-propyl, isopropyl, n-butyl, isobutyl, n-amyl, isoamyl ethers, etc. When hydrating the higher ethers, it is preferable to operate at temperatures lower than those employed for ethyl ether conversion. Likewise, higher space velocities are employed to avoid substantial decomposition of the higher ethers.

Similarly, my process is also adapted to be employed to hydrate olefins directly to the corresponding alcohols, e. g., ethylene to ethyl alcohol, propylene to propyl alcohol etc.

My invention may be subject to modification by those skilled in the art without departing from the scope of the invention which is defined in the claims.

I claim:

1. In the catalytic hydration of an aliphatic ether to the corresponding aliphatic alcohol over a solid hydration catalyst containing a difficultly reducible hydrous oxide whereby a portion of the ether decomposes to olefin hydrocarbon and water, the improvement which consists in carrying out the hydration reaction under superatmospheric pressures, and under olefin partial pressures ranging from 10% to 80% of the total pressure, separating unreacted olefin from the reaction products and returning the unreacted olefin to the reaction zone to maintain the desired olefin partial pressure.

2. In the catalytic hydration of ethyl ether to ethyl alcohol over a solid hydration catalyst containing a difficultly reducible hydrous oxide, the improvement which consists in carrying out the hydration reaction under superatmospheric pressures, and under ethylene partial pressures ranging from 10% to 80% of the total pressure, separating unreacted ethylene from the reaction products and returning unreacted ethylene to the reaction zone to maintain the desired ethylene partial pressure.

3. In the catalytic hydration of ethyl ether to ethyl alcohol over a solid alumina catalyst, the improvement which consists of carrying out the hydration reaction at pressures of about 200 p. s. i. g. and under an ethylene partial pressure of about 25% of the total pressure.

4. In the catalytic hydration of an aliphatic ether to the corresponding aliphatic alcohol over a solid hydration catalyst containing a difficultly reducible hydrous oxide whereby a portion of the ether decomposes to olefin hydrocarbon and water, the improvement which consists in carrying out the hydration reaction under superatmospheric pressures of from 50 to 200 p. s. i. g. and meanwhile introducing additional olefin to maintain the olefin partial pressure from 10% to 80% of the total pressure.

5. In the catalytic hydration of an aliphatic ether to the corresponding aliphatic alcohol over a solid hydration catalyst containing a difficultly reducible hydrous oxide whereby a portion of the ether decomposes to olefin hydrocarbon and water, the improvement which consists in carrying out the hydration reaction at a total pressure of approximately 200 p. s. i. g. and meanwhile introducing additional olefin to maintain the olefin pressure of at least 25% of the total pressure.

6. In the catalytic hydration of ethyl ether to ethyl alcohol over a solid hydration catalyst containing a difficultly reducible hydrous oxide whereby a portion of the ether decomposes to ethylene and water, the improvement which consists in carrying out the hydration reaction under pressures of from 50 to 200 p. s. i. g. and meanwhile introducing additional olefin to maintain the olefin partial pressure of at least 25% of the total pressure.

RALPH BURGESS MASON.

REFERENCES CITED

The following references are of record in the file of this patent:

UNITED STATES PATENTS

| Number | Name | Date |
|---|---|---|
| 1,733,720 | Carter | Oct. 29, 1929 |
| 1,951,740 | Shiffler et al. | Mar. 20, 1934 |
| 2,045,785 | Lewis | June 30, 1936 |
| 2,115,874 | Rehm | May 3, 1938 |
| 2,162,913 | Eversole et al. | June 20, 1939 |
| 2,434,394 | Cheney et al. | Jan. 13, 1948 |